United States Patent
Horn

(10) Patent No.: US 7,590,090 B1
(45) Date of Patent: Sep. 15, 2009

(54) TIME SEGMENTATION SAMPLING FOR HIGH-EFFICIENCY CHANNELIZER NETWORKS

(75) Inventor: William T. Horn, Centennial, CO (US)

(73) Assignee: Lockhead Martin Corporation, Bethesda, MD (US)

( * ) Notice: Subject to any disclaimer, the term of this patent is extended or adjusted under 35 U.S.C. 154(b) by 457 days.

(21) Appl. No.: 11/653,911

(22) Filed: Jan. 17, 2007

(51) Int. Cl.
 *H04W 4/00* (2009.01)
 *H04W 72/00* (2009.01)
 *H04L 12/28* (2006.01)
 *H04L 27/28* (2006.01)
 *H04B 7/00* (2006.01)

(52) U.S. Cl. .............. 370/329; 370/341; 370/431; 375/260; 455/450; 455/509

(58) Field of Classification Search ......... 370/229–235, 370/329–330, 341, 431, 436–437, 532–545; 375/260, E7.002; 455/179.1, 180.1, 450, 455/464, 509
See application file for complete search history.

(56) References Cited

U.S. PATENT DOCUMENTS

| | | | | |
|---|---|---|---|---|
| 5,537,435 A * | 7/1996 | Carney et al. | ............... | 375/219 |
| 6,317,583 B1 * | 11/2001 | Wolcott et al. | ............. | 455/12.1 |
| 6,442,148 B1 * | 8/2002 | Adams et al. | ............. | 370/325 |
| 6,628,920 B1 * | 9/2003 | Wolcott et al. | ............. | 455/12.1 |
| 7,006,474 B2 * | 2/2006 | Oates et al. | ................ | 370/334 |

* cited by examiner

*Primary Examiner*—Tri H Phan
(74) *Attorney, Agent, or Firm*—McDermott Will & Emery LLP

(57) ABSTRACT

A system comprises a processor configured to receive incoming data and configured to apply a subchannelizer algorithm to the received data. The subchannelizer algorithm segments the received data into time segmented data samples and distributes the time segmented data samples into a plurality of data streams for transmission across one of a plurality of interfaces to a network. The system further comprises a register generally coupled to the processor for storing each time segmented data sample prior to transmitting the time segmented data sample across the plurality of interfaces, wherein the time segmented data samples are written to the register at a first frequency and the time segmented data samples are read out of the register at a second frequency. The system is further arranged to receive a plurality of outgoing data streams from the network, and recombine the plurality of outgoing data streams for output to a downlink device.

18 Claims, 5 Drawing Sheets

4 MHz SUBCHANNELIZATION EXAMPLE (27 OF 108 SUBCHANNELS PER CIO MODULE)

TIME SEGMENTATION SAMPLING FOR HIGH-EFFICIENCY CHANNELIZER NETWORKS

TECHNICAL FIELD

The present invention relates to commercial networking systems, and in particular to a system and method for segmenting data into time data samples.

BACKGROUND

In typical networking systems, the high speeds of data processors surpass the technological means for distributing the data within the network. In other words, the processors are generating data at a rate that exceeds the ability of the network to process that data. Typical network systems process streaming data over a set of interfaces. Each interface has a capacity for handling only a portion of the data that is moved through the system. A need exists for an efficient system and method for dividing the data streams across the interfaces, and through the network, to accommodate for the reduction in the effective rate at which data can be processed through the network routers.

One approach for dividing the data streams, where there are a number of separate data channels, is to dedicate certain channels of data to be transferred across certain interfaces. However, especially for network systems that can route data at the channel level, this requires that as a part of the routing process, each router needs access to all of the possible input data. If there are three separate interfaces, for example, there would likely be three routers, and each router must interchange its data with the data from other routers. This leads to additional interconnect. As the number of interfaces increases, the interconnect required quickly becomes unmanageable.

Further, when the network routing function is performed with devices such as field programmable gate arrays ("FPGAs"), each FPGA would require hundreds of extra pins to send and receive data from the other FPGA network routers. The FPGAs would also require additional internal logic to manage those interfaces. In addition, each FPGA has an associated routing table. In connection with this division of the data streams, wherein each FPGA network router is only responsible for routing a subset of the total data channels, the routing tables would become complex, and need to be different for each FPGA network router.

Because data distribution technology typically lags behind data processing technology, there exists a need to efficiently divide up data, using a minimum amount of internal circuitry, bandwidth and interconnects.

The present system and method solves these and other problems by providing time segmentation data sampling. Such sampling occurs by transferring the data for a particular time segment across each interface. By transmitting the data for a certain time segment over each interface, there is no longer a need for network routers to interchange data with each other, because each router has access to all of the data. Thus the interconnect between the routers can be removed. In addition, the configuration of the routing tables is simplified because each network router can route data in the same way. Further, by eliminating the number of pins that had been dedicated to inter-network router data exchange, the number of interfaces supported by each router can be increased, which can improve total system bandwidth and redundancy.

SUMMARY

According to one embodiment, the invention is directed to a system and method that processes streaming data over a set of interfaces, wherein each interface has less capacity to handle the data than the total data being generated by one or more processors. Rather than dedicate certain data channels to be transferred across certain interfaces, the invention provides for segmenting the streaming data into time samples. All the data for a certain time segmented sample is transmitted over each interface during a certain time period. In the case where there are three separate interfaces, for example, each interface would carry all of the data for one-third of the total time the data is being transferred. The interfaces then transmit the data for routing over the network. This invention further provides for receiving data back from the network, and recombining the time segments for output to a downlink device.

According to one embodiment of the invention, a system is provided for time segmentation sampling for satellite networks, and in particular a channelizer network. The system comprises a processor configured to receive incoming data. The processor is also configured to apply a subchannelizer algorithm to the received data, wherein the subchannelizor algorithm segments the incoming data into time segmented data samples and distributes the time segmented data samples into a plurality of data streams for transmission across one of a plurality of interfaces to a network.

The system further comprises a register generally coupled to the processor for storing each time segmented data sample prior to transmitting the time segmented data sample across the plurality of interfaces, wherein the time segmented data samples are written to the register at a first frequency and the time segmented data samples are read out of the register at a second frequency.

The processor is further configured to receive a plurality of outgoing data streams from the network and recombine the plurality of outgoing data streams for output to a downlink device.

In one aspect of the invention, the incoming data stream is received by each of a plurality of processors. The plurality of processors is also configured to apply a subchannelizer algorithm to the incoming data stream. The subchannelizer algorithm segments the received data into time segmented data samples, and distributes the time segmented data samples into a plurality of data streams for transmission to a voting processor prior to being transmitted across a plurality of interfaces. In addition, a plurality of registers is generally coupled to each of the plurality of processors for storing each time segmented data sample prior to transmitting the time segmented data sample to the voting circuit. The time segmented data sample is written to the register at a first frequency, and the time segmented data samples is read out of the register at a second frequency. The plurality of processors are further configured to receive a plurality of outgoing data streams from the network and recombine the plurality of outgoing data streams for output to a downlink device.

In another aspect of the system of the invention, the processor comprises a field programmable gate array.

In yet another aspect of the system of the invention, the incoming data stream is digital data received from an analog digital converter.

In yet another aspect of the system of invention, the plurality of interfaces includes a plurality of serial communication links.

In yet another aspect of the system of invention, the processor includes: logic for storing the time segmented data samples from the processor into a plurality of buffers, and logic for transmitting at least a portion of the time segmented data samples to at least one of a plurality of interfaces when the plurality of buffers have received the maximum amount of data which the interfaces have the capacity to hold.

In another aspect of the system of the invention the processor and the register are located on a channelizer input/output module.

According to one embodiment of the invention, a computer program is provided for segmenting incoming data streams into time segmented samples for satellite networks, and in particular for a channelizer network. The computer program is embodied on a computer readable storage medium adapted to control a computer. The computer program comprises a plurality of code segments for performing the task.

In particular, code segments are provided for segmenting an incoming data stream into a plurality of time segmented data samples, and transmitting the data for each time segmented sample across one of a plurality of interfaces for further transmission to a network.

A code segment is provided for receiving incoming data by at least one processor. A code segment is provided for applying a subchannelizer algorithm to the incoming data, wherein the subchannelizer algorithm segments the incoming data into time segmented data samples and distributes the time segmented data samples into a plurality of data streams for transmission across one of a plurality of interfaces to a network. A code segment is provided for storing each time segmented data sample in a register prior to transmitting each time segmented data sample across one of the plurality of interfaces, and further includes: a code segment for writing into a register at a first frequency; a time segmented data sample; and a code segment for reading out, at a second frequency, each time segmented data sample. Also included is a code segment for receiving a plurality of outgoing data streams from the network, and recombining the plurality of data streams for output to a downlink device.

According to one embodiment of the present invention, the processor comprises a field programmable gate array.

According to another embodiment of the present invention, the incoming data stream is digital data received from an analog digital converter.

According to another embodiment of the present invention, the plurality of interfaces comprises a plurality of serial communication links.

According to another aspect of the present invention, the processor includes: a code segment for storing the time segmented data samples from the processor into a plurality of buffers, a code segment for transmitting at least a portion of the time segmented data samples to at least one of the plurality of interfaces, when the plurality of buffers have received the maximum amount of data which the interfaces have the capacity to hold.

According to yet another aspect of the present invention the processor and the register are located on a channelizer input/output module.

DETAILED DESCRIPTION

Figure 1:
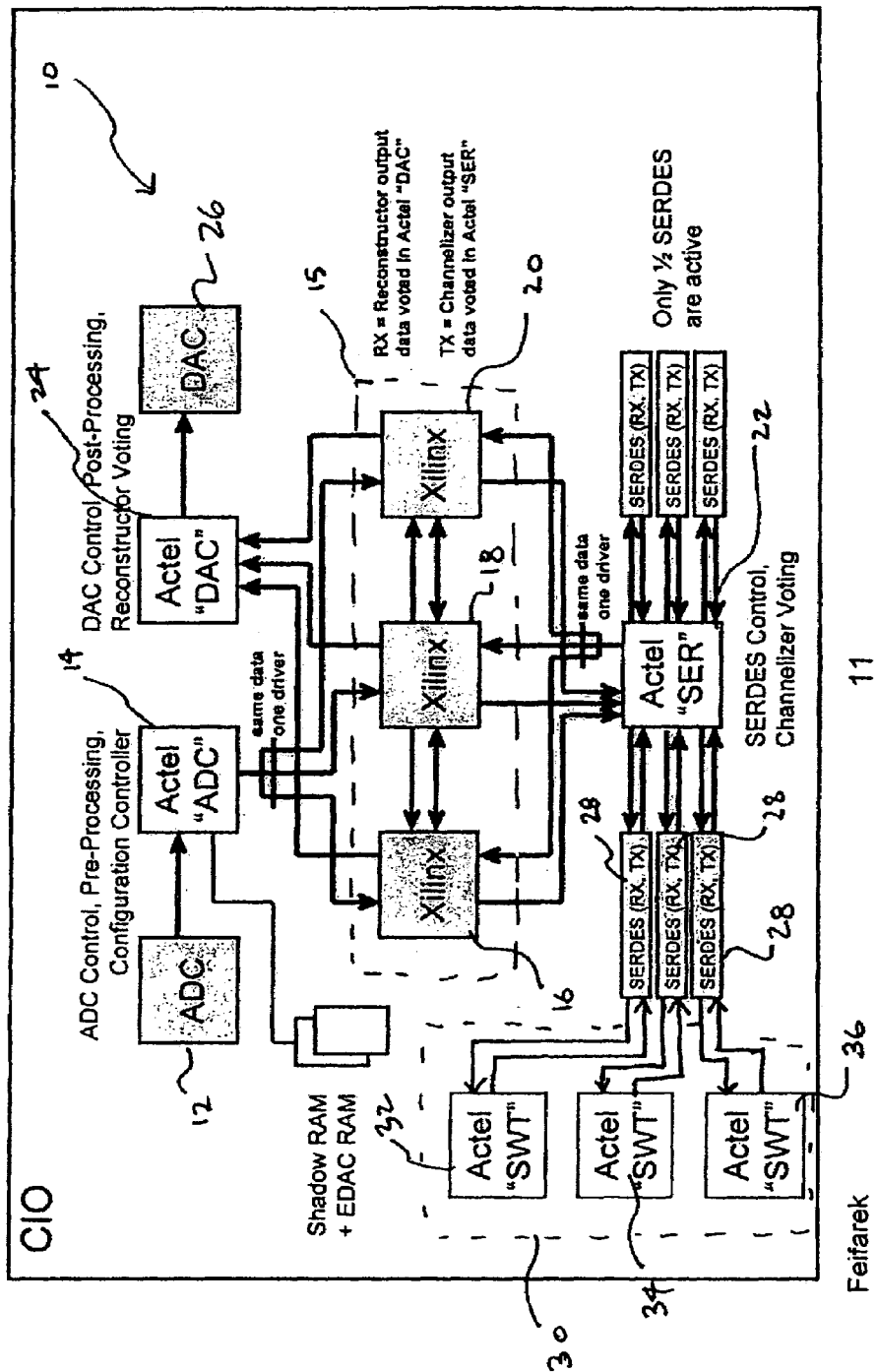
FIG. 1 illustrates a digital channelizer unit coprocessor input/output (DCU CIO) module architecture in accordance with an embodiment of the present invention.

While this invention is susceptible of embodiments in many different forms, there is shown in the drawings and will be described in this specification an example of the invention. It should be understood that the present disclosure is to be considered as an example of the principles of the invention, and is not intended to limit the broad aspect of the invention to the examples illustrated.

One embodiment of the present invention, in which time segmentation sampling may be utilized is a satellite system. The satellite system may be comprised of one or more satellites that are in communication with base stations located on the Earth. A radio frequency (RF) signal having network data, such as audio or video data, is transmitted from one of the base stations on the Earth to a satellite, which processes the data and transmits the data to another base station on the Earth. As one skilled in the art will understand, time segmentation sampling may also be used in commercial satellite networks, such as avionic networks, XM satellite radio, and DirecTV.

Details of these components, and of the operation of these components in connection with the method of the invention, will follow.

FIG. 1 illustrates a digital channelizer unit coprocessor input/output (DCU CIO) module 10 that can be used for segmenting an incoming data stream in a satellite network into a plurality of time segmented data samples. The method and system further transmit the data for each time segmented data sample across one of a plurality of interfaces for transmission to a network. It is contemplated, however, that the time segmentation sampling system may also be employed in other satellite networks, as known to those of ordinary skill in the art.

The DCU CIO module 10 of the invention may be utilized in any one of a plurality of different band plans. A "band plan" uses a designated portion of the electromagnetic spectrum. The band plan generally defines the frequency range to be used by the DCU CIO module 10. The band plan may optionally also define other criteria, including the numbering scheme, the center frequencies, the bandwidths and/or deviation, the spectral mask, the modulation scheme, the content permitted on the band frequency, and procedures required to obtain a license to use the frequency.

In one example, the DCU CIO module 10 is used in a 36 MHz band. The DCU CIO module 10 may also be used in an 8 MHz band, or a 4 MHz band. While this embodiment contemplates the use of the DCU CIO module 10 in 36 MHz, 8 MHz, and/or 4 MHz band plans, it should be understood that any number of band plans, as known to those of ordinary skill in the art, can also be used.

As may best be seen in FIG. 1, the system comprises a plurality of processors. These processors may comprise a plurality of SRAM-based field programmable gate arrays ("FPGAs") 15. As may also be seen in FIG. 1, these SRAM-based FPGAs 15 include a first SRAM-based FPGA 16; a second SRAM-based FPGA 18; and a third SRAM-based FPGA 20. For space-based systems, the plurality of processors 16, 18, and 20 may be field programmable gate arrays. An example of a commercially available SRAM-based FPGA that may be used in connection with this invention is a Xilinx FPGA XQR2V6000. Although one embodiment includes a plurality of processors, it is understood by one skilled in the art that a single processor may be used in the present invention.

In one embodiment of this invention, as shown in FIG. 1, these FPGAs 16, 18, and 20 may be communicably coupled to a processor 14 to receive incoming data for processing. The processor, as illustrated in the DCU CIO module 10, may be an ACTEL analog-to-digital converter ("ADC") 14.

Each of the plurality of processors 16, 18, and 20 has an associated memory register. It will be understood that the memory register can be a block random access memory (BRAM) disposed in each of the plurality of processors 16, 18, 20, or a BRAM separate from each of the plurality of processors 16, 18, 20 that each of the plurality of processors 16, 18, 20 can remotely access. Each of the plurality of processors 16, 18, and 20 receives identical incoming data. After applying a subchannelizer algorithm to divide the incoming data into time segmented samples, the processors store the data packet in their respective memory register.

Figure 4:
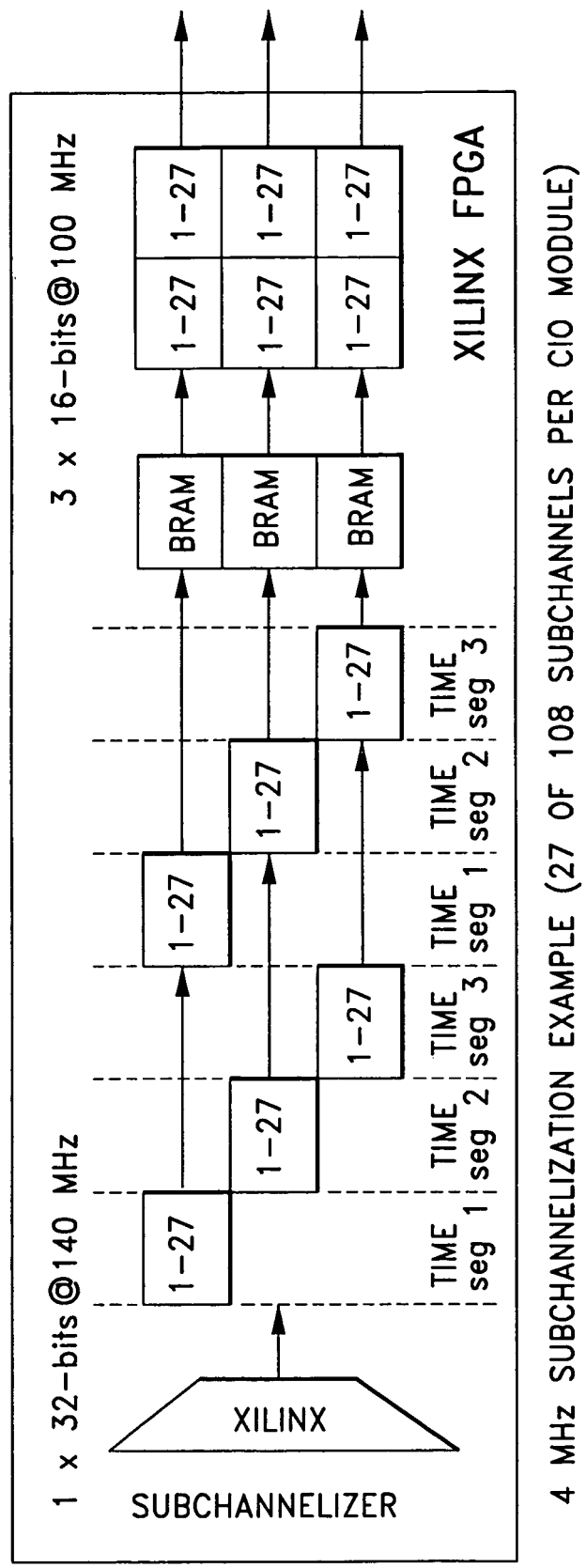
FIG. 4 illustrates a single field programmable gate array processor in accordance with an embodiment of the present invention.

FIG. 4 illustrates, according to one embodiment of this invention, a single Xilinx FPGA processor and the segmentation of data that occurs within the Xilinx FPGA processor. The number of channels used in the algorithm will vary according to the bandplan, and the bandplan used in the invention will depend on how many channels can be transmitted across the plurality of interfaces to the network. In FIG. 4, the FPGA processor is operating on a 4 MHz bandplan and is receiving 32-bit wide data at a frequency of 140 MHz. The FPGA processor applies a subchannelizer algorithm to the incoming 32-bit wide data at a frequency of 140 MHz, and in this example segments the data into three 16-bit wide data streams, each comprising 27 channels. It is contemplated that the data elements for each subchannel group will consist of two related samples, I and Q data. While this embodiment contemplates the use of a 4 MHz band plan, it should be understood that any number of band plans, as known to those of ordinary skill in the art, can also be used.

After applying a subchannelizer to divide the incoming data stream into time segments and transmitting each time segment into three 16-bit wide data streams, the time segments are placed, according to one embodiment of the invention, in the FPGA processor's associated memory register. In a preferred embodiment, the FPGA processor's associated memory register includes three BRAMs. Each of the three BRAMs has eight buffer areas to hold incoming data, however, it is contemplated that any number of buffers may be used. The first set of subchannelized data is stored at one frequency in the first BRAM, the second set of subchannelized data in the second BRAM, and the third set of subchannelized data in the third BRAM. When all three BRAMs have at least one complete subchannel data group, as will be described below, then all three BRAM outputs are enabled to the interfaces at a second frequency. The multiple buffers in each of the three BRAMs allow for the subchannelized data to be stored in each buffer at one frequency, typically a faster speed than the network can handle, and then read out to the network at a second frequency, typically a slower speed to match the rate of data that can be transmitted by the network. In an alternative embodiment, typically when a plurality of FPGA processors, rather than a single FPGA processor, are outputting data, the complete subchannel group will be enabled first to a voting processor and then to the interfaces, as will be explained further herein.

Figure 3:
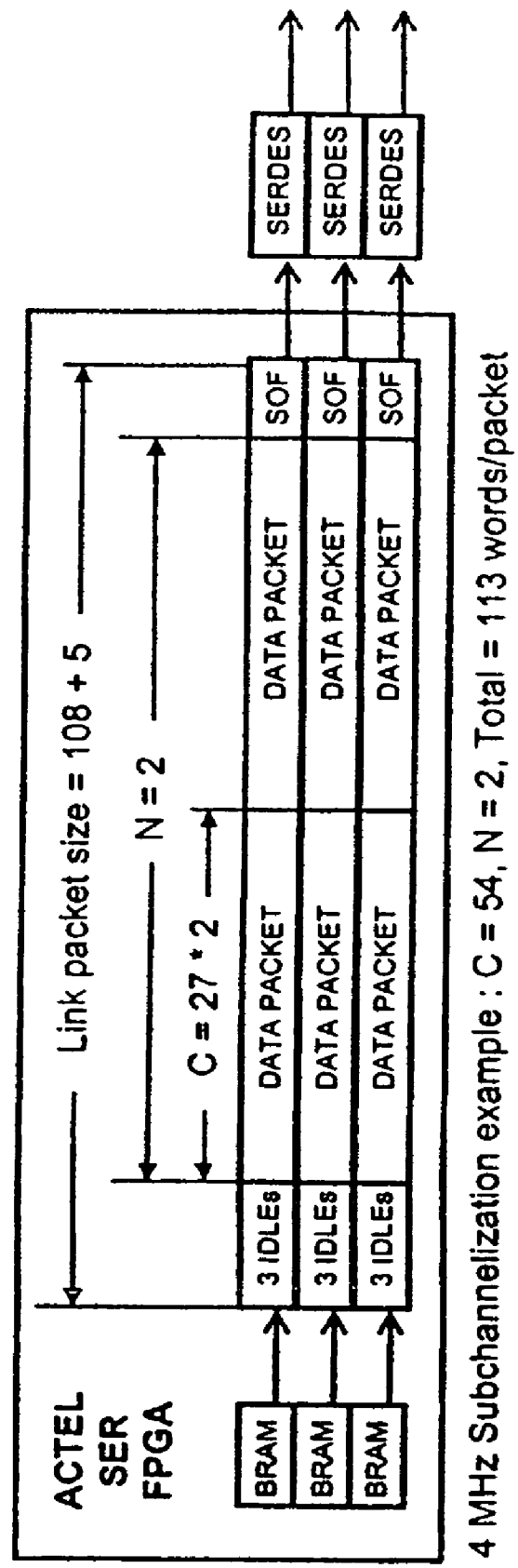
FIG. 3 illustrates a serial link packet in accordance with an embodiment of the present invention.

In a preferred embodiment, each BRAM can provide storage for up to two data packets. For example, as shown in FIG. 3, when using an algorithm that transmits an 116-bit data element, followed by a Q 16-bit data element over 27 subchannels, an FPGA data packet will comprise two time segments or two sets of subchannelized data. In light of the high data generation rates and the slower data transfer rates of the interfaces and the network, there is not sufficient bandwidth to transmit each set of subchannelized data. Therefore, the sets of subchannelized data need to be grouped into a time segment that contains a defined number of 16-bit words. Further, the data packet to be sent over the network is grouped together in a defined number of 16-bit data words to accommodate for the reduced rate of data that can be transmitted by the network. The packet format to be sent over the network is configurable in two respects. In the first respect, it is configurable according to the number of subchannels that the band plan generates. In the second respect, it is configurable according to the capacity of the network to transmit the data.

The equation for the programmable packet size is:

$$C*2*N+4, \text{ where}$$

C=# of subchannels of bandplan*2, for I & Q data

N=# of sets of C that a Network can transmit

+4 for 1 Start of Frame and 3 Idles.

It will be understood by one skilled in the art that the number of channels and the number of words per time segment is configurable for the specific band plan used in the invention, as well as the capacity of the network used in the invention to transmit the data.

In a preferred embodiment, shown in FIG. 3, the commercial interface used to transmit the data to the network is a Serdes serial link (Serdes). The packet size for the Serdes is generally a multiple of the network router packet size. In the preferred embodiment that uses an algorithm that divides data into 27 subchannels, the Serdes packet size may contain 108 words plus one Start of Frame and a few Idles:

$$27*2(16 \text{ bit words})*2 \text{ sets of subchannel data=2 data packets.}$$

FIG. 1 shows a voting processor 22, identified as an Actel "SER." According to one embodiment of this invention, the voting processor 22 may be communicatively coupled to each of the plurality of processors 16, 18, and 20. The voting processor 22 receives at least a portion of the data packets from each of the plurality of processors 16, 18, and 20. The voting processor 22 utilizes a synchronization pulse generated by the ADC 14 to align each of the received portions of the data packets, according to the synchronization pulse prior to voting. In one embodiment, the voting processor 22 may be a majority voting circuit. This voting process is described in the assignee's co-pending United States Patent Application "Efficient High Bandwith Networking Using Multilayered Routing" Ser. No. 11/708,040. The disclosures of that co-pending application are incorporated herein by reference.

The voting processor 22 generates a first network data packet, based on a majority vote of each of the received data packets from the plurality of processors 16, 18, and 20. As a result, the synchronization pulse is converted into a synchronized word in the first network.

Figure 2:
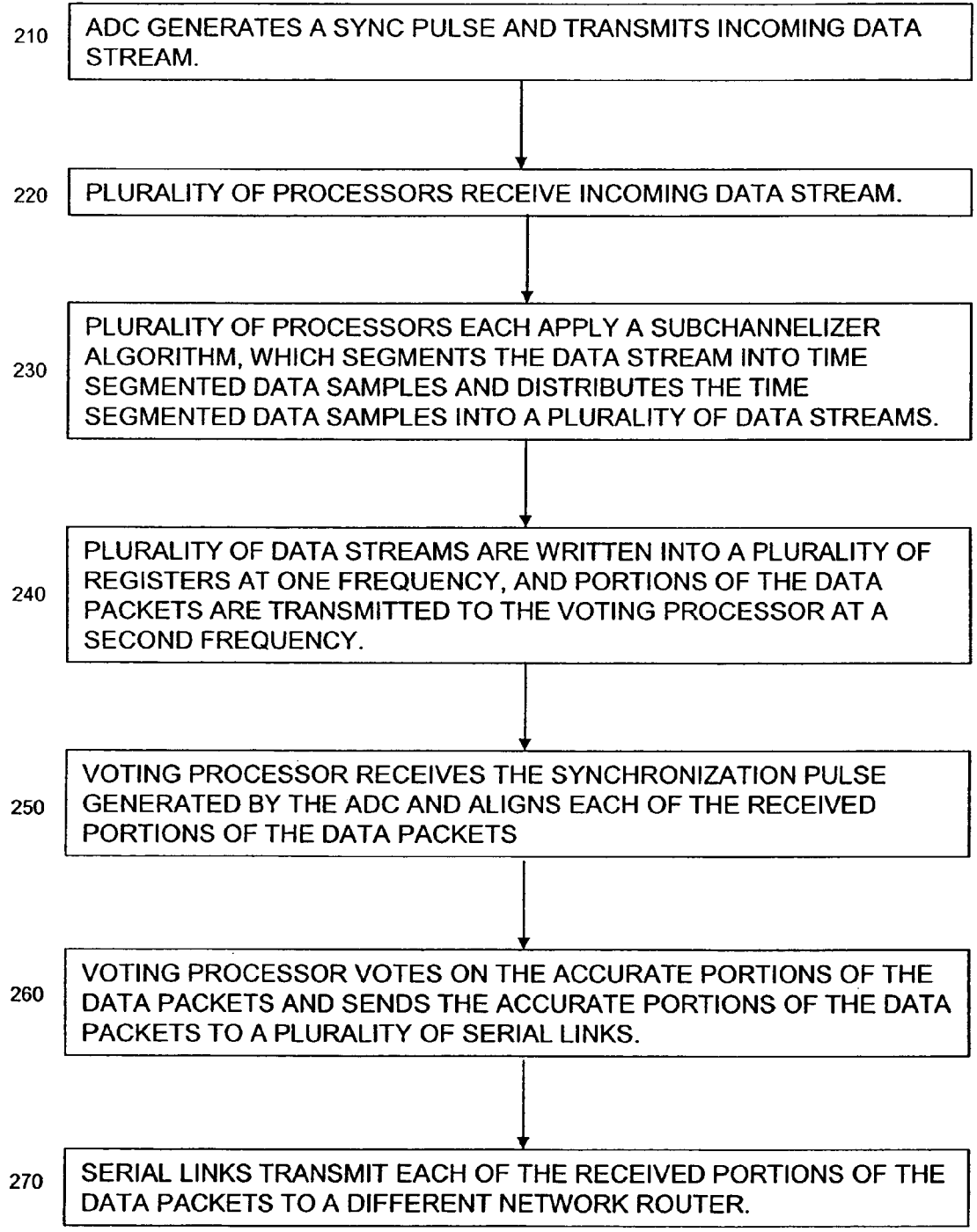
FIG. 2 is a flow chart illustrating a system for time segmenting data samples in accordance with an embodiment of the present invention.

FIG. 2 is a flowchart illustrating one example of the steps associated with segmenting data into time samples using the plurality of processors 15 and the voting processor 22. As seen in step 210, the ADC 14 generates a synchronization pulse and transmits an incoming data stream to the plurality of processors 15. After the plurality of processors 15 receive the incoming data stream and the synchronization pulse 220 from the ADC 14, the plurality of processors 15 then apply a subchannelizer algorithm to the received data stream 230. The subchannelizer algorithm segments the incoming data stream into time segmented data samples and distributes the time segmented data samples into a plurality of data streams 230. Each processor 16, 18, 20, writes each of the plurality of time segmented data streams into one of three associated BRAMS at one frequency, creates data packets from the time segmented data streams, and then transmits the data packets, or a portion of the data packets, to the voting processor 22 at a second frequency 240. The voting processor 22 receives the synchronization pulse generated by the ADC 14 and aligns each of the received portions of the data packets 250, from the plurality of processors 15. The voting processor 22 also votes on the accurate data packets, or portions of the data packets, and sends the data packets, or a portion of the data packets 260, to a plurality of serial links 28. In addition, the serial links 28 transmit each of the received data packets, or portions of the data packets 270, to a different network router 30.

In addition, a plurality of serializer/deserializer (Serdes link) 28 may be used to transmit the plurality of data streams from the internal interface of the subchannelizer to the network switch/routers. In one embodiment, data from the internal interface to the voter shall be buffered at least one packet deep and sent to the Serdes link in a round-robin fashion: the first packet generated by the subchannelizer relative to the internal sync pulse shall be routed to the Serdes Link A, the next packet to Serdes Link B, and the next packet to Serdes Link C. This sequence shall then repeat (sending to A, B, C, A, etc.). Alternatively, in the case when a single processor is used, data packets may be sent directly to the Serdes links 28.

In the CIO module 10, each serial link transmits each data stream to one of a plurality of network switch/router FPGAs ("SWT") 30, including a first SWT 32, a second SWT 34, and a third SWT 36. An example of a commercially available network switch/router FPGA that may be used in connection with this invention is an Actel FPGA. In a preferred embodiment, each of three Actel "SWT" units 32, 34, and 36 of the SWT 30 receives one-third of the total system data from the SER FPGA 22, and stores the counter word generated by each respective SER FPGA 22 with the data packet received from that SER FPGA 22. In addition, the SWT 30 is responsible for routing data in the network. Each SWT 32, 34, and 36 of the SWT 30 replicates the incoming data stream, and performs the steps needed for the data selection required to produce the appropriate output packets. The SER FPGA 22 returns the counter word to the output packet, and transmits the output packet to the SER FPGA 22 over the serial link. The output packet may be transmitted to the SER FPGA 22 in DCU CIO 10 shown in FIG. 2, or a SER FPGA in another DCU CIO (not shown). The routing process is described in greater detail in the assignee's co-pending United States Patent Application entitled "Efficient High Bandwith Networking Using Multi-layered Routing" Ser. No. 11/708,040. The disclosures of that co-pending application are incorporated herein by reference.

Once the plurality of SWT 30 have completed routing the data packets through the network, each SWT 32, 34, 36 sends its data stream back to the voting processor 22 via a plurality of Serdes 28. The outgoing network data packets include a synchronization word that is representative of a second synchronization pulse.

The voting processor 22 generates a second synchronization signal indicating the first word of a data packet, and transmits the synchronization signal and a portion of the outgoing network data packets into a plurality of 16-bit wide time segmented data streams to each of the plurality of processors 16, 18, and 20. Each of the plurality of processors 16, 18, and 20 receives the second synchronization pulse and the plurality of data streams, and each of the plurality of processors 16, 18, and 20 stores the synchronization pulse and each of the plurality of data streams into one of its three associated BRAMs at a first frequency. In a preferred embodiment, the counter word included in each time segmented data stream is used to determine the buffer location within each BRAM in which to store the time segmented data stream. By storing the time segmented data stream in a specific buffer, according to the counter word, the time segmented data stream can then be properly read out of its respective buffer in correct order, even if the correct ordering of the time segmented data stream had become out of sync going through the network.

The system also includes a second voting processor 24. This second voting processor 24 is shown in FIG. 1 and may be an Actel "DAC". This second voting processor 24 is communicatively coupled to the plurality of processors 16, 18, and 20. The second voting processor 24 receives at least a portion of the data streams from each of the plurality of processors 16, 18, and 20, at a second frequency. The second voting processor 24 utilizes the synchronization pulse to align each of the received data streams, according to the synchronization pulse prior to voting.

After the DAC FPGA 24 votes on the data, the synchronization is discarded and the data is converted to an analog signal to be transmitted to the DAC 26 for down-linking to a base station or another satellite.

Figure 5:
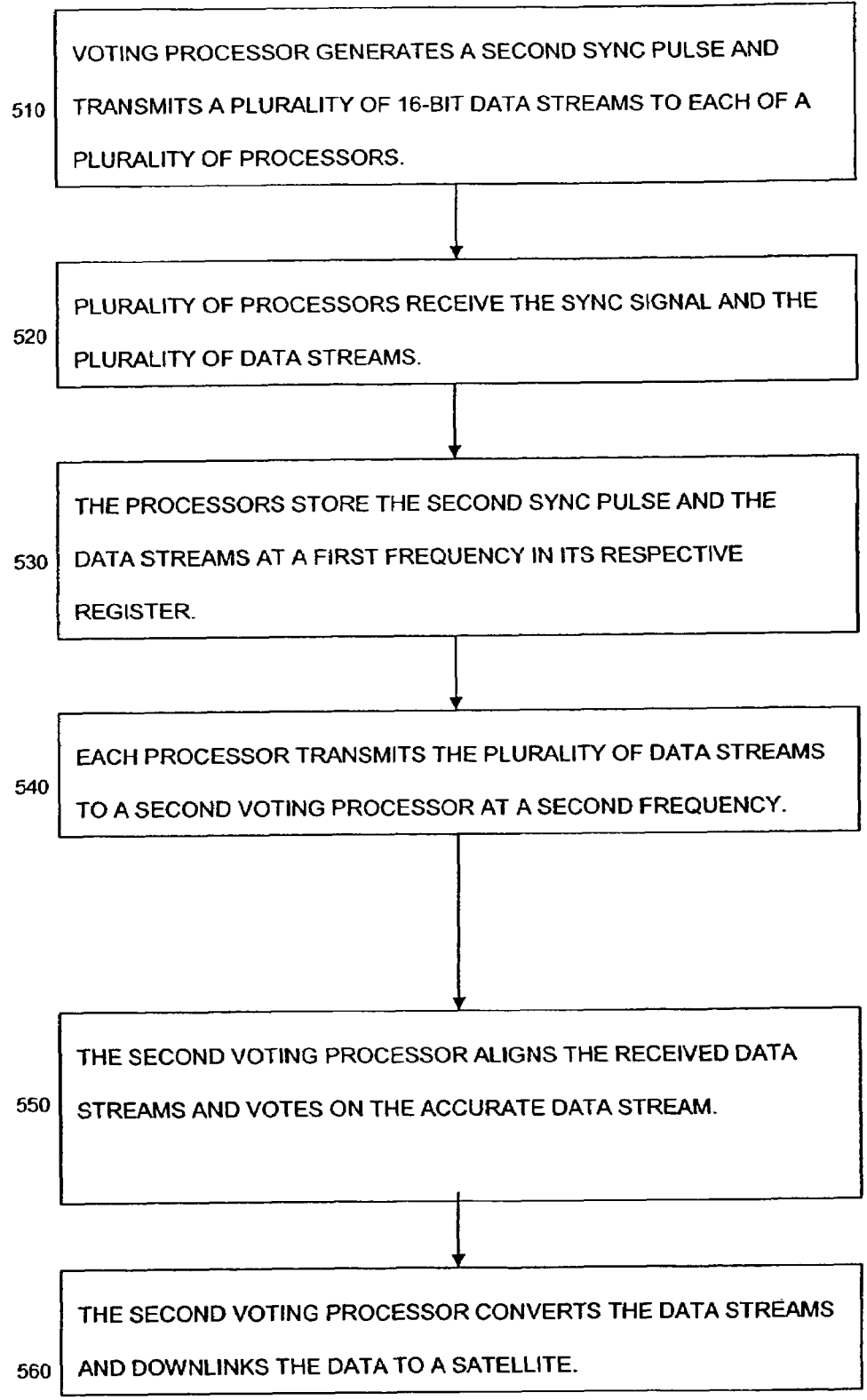
FIG. 5 is a flow chart illustrating a system for reconstructing the time segmented data samples in accordance with an embodiment of the present invention.

FIG. 5 is a flowchart illustrating one example of the steps associated with reconstructing the time segmented data samples for output to a downlink device. The voting processor 22 generates a second synchronization pulse and transmitting portions of the outgoing network data packets into a plurality of 16-bit data streams 510 to each of a plurality of processors 15. Each of the plurality of processors 15 receive the second synchronization pulse and the plurality of outgoing network data streams 520. Each processor stores the second synchronization pulse and each of the plurality of data streams, at a first frequency, in one of its three associated BRAMs 520. Each of the plurality of data streams is then transmitted, to a second voting processor 24, at a second frequency 540. The second voting processor 24 then utilizes the synchronization pulse to align each of the received data streams and votes on the accurate data stream 550. In addition, the second voting processor converts the data to an analog signal to be transmitted for down-linking to a base station or another satellite 560.

This specification describes what the inventors consider to be the best mode of the invention. It should be understood that various modifications to the examples described in the specification may be implemented, which modifications could be used in other environments and settings, that would still come within the scope of the invention.

In addition, those of ordinary skill in that art will recognize that the disclosed aspects of the invention could be altered or amended, without departing from the spirit and scope of the invention. Thus, the subject matter of the invention is not intended to be limited to the specific details, exhibits and illustrated examples in this description. It is instead intended to protect any modifications and variations that fall within the scope of the advantageous concepts disclosed in this specification.

I claim:

1. A system for segmenting an incoming data stream into a plurality of time segmented data samples and transmitting the data for each time segmented data sample across one of a plurality of interfaces for transmission to a network, the system comprising:
   a processor configured to receive incoming data;
   said processor configured to apply a subchannelizer algorithm to the received data, wherein the subchannelizer algorithm segments the incoming data into time segmented data samples and distributes the time segmented data samples into a plurality of data streams for transmission across one of a plurality of interfaces to a network;
   a register generally coupled to the processor for storing each time segmented data sample prior to transmitting the time segmented data sample across the plurality of interfaces, wherein the time segmented data samples are written to the register at a first frequency and the time segmented data samples are read out of the register at a second frequency;
   said processor further configured to receive a plurality of outgoing data streams from the network and recombine the plurality of outgoing data streams for output to a downlink device.

2. The system of claim 1 wherein the processor comprises a field programmable gate array.

3. The system of claim 1 wherein the incoming data stream is digital data received from an analog digital converter.

4. The system of claim 1 wherein the plurality of interfaces comprises a plurality of serial communication links.

5. The system of claim 1 wherein the processor includes:
   logic for storing the time segmented data samples from the processor into a plurality of buffers;
   logic for transmitting at least a portion of the time segmented data samples to at least one of a plurality of interfaces when the plurality of buffers have received the maximum amount of data which the interfaces have the capacity to hold.

6. The system of claim 1 wherein the processor and the register are located on a channelizer input/output module.

7. A system for segmenting an incoming data stream into a plurality of time segmented data samples and transmitting the data for each time segmented sample across one of a plurality of interfaces for transmission to a network, the system comprising:
   a plurality of processors configured to receive identical incoming data;
   said plurality of processors configured to apply a subchannelizer algorithm to the received data, wherein the subchannelizer algorithm segments the received data into time segmented data samples and distributes the time segmented data samples into a plurality of data streams for transmission to a voting processor prior to being transmitted across a plurality of interfaces;
   a register is generally coupled to each of the plurality of processors for storing each time segmented data sample prior to transmitting the time segmented data sample to the voting processor, wherein the time segmented data sample is written to the register at a first frequency and the time segmented data samples is read out of the register at a second frequency;
   said plurality of processors further configured to receive a plurality of outgoing data streams from the network and recombine the plurality of outgoing data streams for output to a downlink device.

8. The system of claim 7 wherein the plurality of processors comprise at least three field programmable gate arrays.

9. The system of claim 7 wherein the incoming data stream is digital data received from an analog digital converter.

10. The system of claim 7 wherein the plurality of interfaces comprises a plurality of serial communication links.

11. The system of claim 7 wherein each of the plurality of processors includes:
    logic for storing the time segmented data samples from the processor into a plurality of buffers;
    logic for transmitting at least a portion of the time segmented data samples to the voting processor when the plurality of buffers have received the maximum amount of data which the interfaces have the capacity to hold.

12. The system of claim 7 wherein the plurality of processors and the register are located on a channelizer input/output module.

13. A computer readable medium adapted to control a computer and comprising a plurality of code segments for segmenting an incoming data stream into a plurality of time segmented data samples and transmitting the data for each time segmented sample across one of a plurality of interfaces for further transmission to a network, the computer readable medium comprising:
    a code segment for receiving incoming data by a processor;
    a code segment for applying a subchannelizer algorithm to the incoming data, wherein the subchannelizer algorithm segments the incoming data into time segmented data samples and distributes the time segmented data samples into a plurality of data streams for transmission across one of a plurality of interfaces to a network;
    a code segment for storing each time segmented data sample in a register prior to transmitting each time segmented data samples across one of the plurality of interfaces, and further comprising:
    a code segment for writing into a register, at a first frequency, a time segmented data sample; and
    a code segment for reading out, at a second frequency each time segmented data sample;
    a code segment for receiving a plurality of outgoing data streams from the network, and recombining the plurality of data streams for output to a downlink device.

14. The computer readable medium of claim 13 wherein the processor comprises a field programmable gate array.

15. The computer readable medium of claim 13 wherein the incoming data stream is digital data received from an analog digital converter.

16. The computer readable medium of claim 13 where the plurality of interfaces comprises a plurality of serial communication links.

17. The computer readable medium of claim 13 wherein the processor includes:
    a code segment for storing the time segmented data samples from the processor into a plurality of buffers;
    a code segment for transmitting at least a portion of the time segmented data samples to at least one of the plurality of interfaces, when the plurality of buffers have received the maximum amount of data which the interfaces have the capacity to hold.

18. The computer readable medium of claim 13 wherein the processor and the register are located on a channelizer input/output module.

* * * * *

UNITED STATES PATENT AND TRADEMARK OFFICE
CERTIFICATE OF CORRECTION

| | | |
|---|---|---|
| PATENT NO. | : 7,590,090 B1 | Page 1 of 1 |
| APPLICATION NO. | : 11/653911 | |
| DATED | : September 15, 2009 | |
| INVENTOR(S) | : William T. Horn | |

It is certified that error appears in the above-identified patent and that said Letters Patent is hereby corrected as shown below:

ON THE COVER PAGE:

(73) Assignee: "Lockhead" should read --Lockheed--

Signed and Sealed this

Twenty-ninth Day of December, 2009

David J. Kappos
*Director of the United States Patent and Trademark Office*